(12) United States Patent
Harrison et al.

(10) Patent No.: US 7,403,938 B2
(45) Date of Patent: *Jul. 22, 2008

(54) NATURAL LANGUAGE QUERY PROCESSING

(75) Inventors: Tom Harrison, Newton, MA (US); Michael E. Barrett, Westborough, MA (US); Swarup Reddi, Berkeley, CA (US); John Lowe, Berkeley, CA (US); Gary Chevsky, Alamo, CA (US)

(73) Assignee: IAC Search & Media, Inc., Oakland, CA (US)

( * ) Notice: Subject to any disclaimer, the term of this patent is extended or adjusted under 35 U.S.C. 154(b) by 1355 days.

This patent is subject to a terminal disclaimer.

(21) Appl. No.: 10/251,929

(22) Filed: Sep. 20, 2002

(65) Prior Publication Data

US 2003/0069880 A1    Apr. 10, 2003

Related U.S. Application Data

(60) Provisional application No. 60/324,726, filed on Sep. 24, 2001.

(51) Int. Cl.
    G06F 17/30    (2006.01)
(52) U.S. Cl. .......................................... 707/3
(58) Field of Classification Search .................... 707/1, 707/2, 5, 10, 200, 513, 3; 709/202
    See application file for complete search history.

(56) References Cited

U.S. PATENT DOCUMENTS

| | | | |
|---|---|---|---|
| 5,404,514 A * | 4/1995 | Kageneck et al. ............... 707/5 |
| 5,454,106 A | 9/1995 | Burns et al. ................... 395/600 |
| 5,490,061 A | 2/1996 | Tolin et al. ...................... 704/2 |
| 5,493,677 A | 2/1996 | Balogh et al. ............... 707/104.1 |
| 5,555,408 A | 9/1996 | Fujisawa et al. ................ 707/5 |
| 5,590,325 A | 12/1996 | Kolton et al. ................... 707/3 |
| 5,617,119 A | 4/1997 | Briggs et al. ................ 707/100 |
| 5,634,086 A | 5/1997 | Rtischev et al. ............. 704/270 |
| 5,642,502 A | 6/1997 | Driscoll ........................... 707/5 |
| 5,717,913 A | 2/1998 | Driscoll ........................... 707/5 |
| 5,742,816 A | 4/1998 | Barr et al. ........................ 707/3 |

(Continued)

OTHER PUBLICATIONS

Androutsopoulos, I., G. Ritchie, and P. Thanisch. "Natural Language Interfaces to Databases—An Introduction." Journal of Natural Language Engineering. Cambridge University Press: Edinburgh, Scotland. 1995.

(Continued)

*Primary Examiner*—Etienne P LeRoux
(74) *Attorney, Agent, or Firm*—Blakely, Sokoloff, Taylor & Zafman; Stephen M. De Klerk

(57) ABSTRACT

An enhanced natural language information retrieval technique tokenizes an incoming query, comparing the tokenized representation against a collection of query templates. Query templates include a first portion having one or more query patterns representative of a query and in a form suitable for matching the tokenized representation of an incoming query. Query templates also include one or more information retrieval commands that are designed to return information relevant to those query patterns in its first portion. The enhanced natural language information retrieval technique selects those query templates that are determined to be most relevant to the incoming query (via its tokenized representation) and initiates one or more information retrieval commands associated with the selected query templates.

23 Claims, 9 Drawing Sheets

U.S. PATENT DOCUMENTS

| | | | |
|---|---|---|---|
| 5,778,357 | A | 7/1998 | Kolton et al. ............... 707/2 |
| 5,870,701 | A | 2/1999 | Wachtel ..................... 704/9 |
| 5,870,741 | A | 2/1999 | Kawabe et al. ............. 707/5 |
| 5,884,302 | A | 3/1999 | Ho ............................. 707/3 |
| 5,893,092 | A | 4/1999 | Driscoll ..................... 707/5 |
| 5,893,101 | A | 4/1999 | Balogh et al. ............. 707/100 |
| 5,895,464 | A | 4/1999 | Bhardari et al. ........... 707/3 |
| 5,933,822 | A | 8/1999 | Braden-Harder et al. ... 707/5 |
| 5,950,194 | A | 9/1999 | Bennett et al. ............. 707/3 |
| 5,991,721 | A | 11/1999 | Asano et al. ............... 704/257 |
| 6,026,395 | A | 2/2000 | Bennett et al. ............. 707/3 |
| 6,052,439 | A | 4/2000 | Gerszberg et al. ......... 379/88.01 |
| 6,055,531 | A | 4/2000 | Bennett et al. ............. 707/5 |
| 6,078,914 | A | 6/2000 | Redfern ..................... 707/3 |
| 6,078,917 | A | 6/2000 | Paulsen, Jr. et al. ........ 707/6 |
| 6,088,692 | A | 7/2000 | Driscoll ..................... 707/5 |
| 6,138,100 | A | 10/2000 | Dutton et al. .............. 704/275 |
| 6,167,370 | A | 12/2000 | Tsourikov et al. .......... 704/9 |
| 6,236,959 | B1 | 5/2001 | Weise ........................ 704/9 |
| 6,256,618 | B1 | 7/2001 | Spooner et al. ............ 706/13 |
| 6,304,864 | B1 | 10/2001 | Liddy et al. ................ 706/15 |
| 6,327,593 | B1 | 12/2001 | Goiffon ...................... 707/102 |
| 6,393,428 | B1 | 5/2002 | Miller et al. ............... 707/102 |
| 6,397,179 | B2 | 5/2002 | Crespo et al. .............. 704/242 |
| 6,665,666 | B1* | 12/2003 | Brown et al. ............... 707/5 |
| 6,829,603 | B1* | 12/2004 | Chai et al. .................. 707/5 |
| 2003/0028564 | A1* | 2/2003 | Sanfilippo .................. 707/513 |
| 2004/0030741 | A1* | 2/2004 | Wolton et al. .............. 709/202 |

OTHER PUBLICATIONS

"The AnswerLogic AEI™ Answer Engine." www.answerlogic.com (no longer available) Sep. 2000. pp. 1-3.

"AnswerLogic: Introducing the AnswerLogic Solution." www.answerlogic.com (no longer available) Sep. 2000. pp. 1-2.

Barrett, Leslie, Anthony Davis, and Bonnie J. Dorr. "Interpretation of Compound Nominals using WordNet." Proceedings of the Second International Conference on Intelligent Text Processing and Computational Linguistics (CICLing). Mexico City, Mexico, 2001.

Burton, R.R., and J.S. Brown. "Toward a Natural-Language Capability for Computer-Assisted Instruction." Procedures for Instructional Systems Development. Academic Press. 1979.

Jacobs, Paul. "The New Language of Customer Interaction." Primus Solutions, Inc. www.primus.com/products/whitepapersResearch/default.asp. Aug. 2002. pp. 1-15.

"Natural Language Processing: A Brief History for Scientists and Skeptics" www.answerlogic.com (no longer available) Sep. 2000, pp. 1-3.

"Natural Language Question Answering." Primus Solutions, Inc. www.primus.com/products/whitepapersResearch/default.asp. Nov. 2001. pp. 1-9.

"Question-Answering—Providing Effective Customer Support Online." www.answerlogic.com (no longer available) Oct. 2000. pp. 1-2.

"Search Engines Vs. Answer Engines." www.answerlogic.com (no longer available) Sep. 2000. pp. 1-3.

Yuret, Deniz. "Discovery of Linguistic Relations Using Lexical Attraction." http://www.ai.mit.edu/people/deniz/publications/yuretphd/. Massachusetts Institute of Technology. Cambridge, Massachusetts. May 15, 1998.

* cited by examiner

STEMMING

SYNONYMS

WWW.FINANCIAL.COM/ACCOUNTS/IRA

/ 35
1        2-5       / 37
IRAS <PARAGRAPH SPACER>

6   7   8   9   10 11   12
ABC OFFERS ITS CUSTOMERS TO IRA ACCOUNTS:

13     14     15
1. INDIVIDUAL RETIREMENT ACCOUNTS 16  17   18-19    / 39
2. ROTH IRA <SENTENCE SPACER>

20  21   22   23    24
FOR TAX INFORMATION SEE | WWW.IRS.IRA.GOV |
                          38               38

FIG. 4

INDEX

| TOKEN OR ENTITY | PAGE | TOKEN POSITION |
|---|---|---|
| IRA | WWW.FINANCIAL.COM/ACCOUNTS/IRA | 1 |
| IRA | WWW.FINANCIAL.COM/ACCOUNTS/IRA | 11 |
| IRA | WWW.FINANCIAL.COM/ACCOUNTS/IRA | 17 |
| ACCOUNTS | WWW.FINANCIAL.COM/ACCOUNTS/IRA | 12 |
| INDIVIDUAL RETIREMENT ACCOUNTS | WWW.FINANCIAL.COM/ACCOUNTS/IRA | 13 |
| ACCOUNTS | WWW.FINANCIAL.COM/ACCOUNTS/IRA | 15 |
| ROTH | WWW.FINANCIAL.COM/ACCOUNTS/IRA | 16 |
| <IRA> | WWW.FINANCIAL.COM/ACCOUNTS/IRA | 1 |
| <IRA> | WWW.FINANCIAL.COM/ACCOUNTS/IRA | 11 |
| <IRA> | WWW.FINANCIAL.COM/ACCOUNTS/IRA | 13 |
| <IRA> | WWW.FINANCIAL.COM/ACCOUNTS/IRA | 16 |
| URL | WWW.FINANCIAL.COM/ACCOUNTS/IRA | 24 |

FIG. 5

NATURAL LANGUAGE QUERY PROCESSING

This application claims priority on the U.S. Provisional application entitled "Automated Customer Communication and Answering System" by T. Harrison, M. Barrett, S. Reddi and J. Lowe, filed Sep. 24, 2001 (Ser. No. 60/324,726).

BACKGROUND

The invention relates generally to query processing for computer systems and, more particularly but not by way of limitation, to processing and responding to natural language queries. Methods in accordance with the invention are applicable to web-based, database-based and text-based search environments.

Today, web sites use any number of techniques to allow users to search for relevant information and answers. Some use the concept of Frequently Asked Questions, which, in actuality, are questions wholly created by the web site owner in anticipation of the questions that users may want to ask, but are not truly created from actual questions from users, and often do not use existing data. Web sites also allow searching of the web site using various techniques, including relatively simple search techniques based on key words.

Ask Jeeves, Inc. has previously provided its business solutions customers the ability to use natural language searching to respond to users' information retrieval needs. The product offered today is Jeeves Solutions Relevant Answers. However, that product uses very basic natural language searching where editors actually anticipate questions and the answers to those questions, and use natural language processing (NLP) to match the actual question to the anticipated questions from the editors. Finally, if the questions cannot be matched, the natural language search follows standardized techniques of eliminating stop words and searching for remaining key words.

Natural language searching is desired because it allows users to speak their own language when formulating their request for information, rather than forcing them to speak in a form the search engine can understand. What is needed is an improved natural language search engine that will be automated in a way that provides more accurate returned information over and above simply searching for all the words in the question, other than the stop words.

Another problem with existing means of analyzing interactions with customers at a company web site is that the information gathered by the most sophisticated Customer Relationship Management systems can be skewed by the presentation of information on the site. For instance if the user is forced to choose from preselected search queries or items on the site, the site's owner may not be getting the insight into the user's thinking that may help anticipate future needs. By allowing a user to formulate queries in a true natural language format, and tracking the queries and whether they tend to be in certain topic areas, or whether the tone is negative or positive, the owner of the site is provided significantly more insight into the thinking and motivation of its customers.

Web site's have become a very prominent way in which companies communicate with their customers. Companies spend tremendous sums of money to design and create their web sites' content, as well as the look and feel, to match their overall brand image. Yet, when customers start using search techniques on the site, the same companies generally turn over the customer experience to rudimentary, and sometimes very unsatisfying search experiences. What is needed is the ability for companies to use web site searching as an additional extension of their carefully designed communication with a customer. For instance, if at a financial institution's web site a user inquires about closing an account, the financial institution may wish to direct the user to a special offer page, or open a chat session with the user to attempt to keep their business. In other words, providing a search mechanism on a web site should not be seen as a convenience for customers, but instead should be used as a direct, interactive communication tool with the user. This will facilitate transactions and all interactions to maximize the web site's existing infrastructure to the company's maximum advantage.

An additional need for the use of natural language searching is to recognize that what is natural language for one industry may not equally apply to another industry. For instance, if a user is searching for information on IRA, they may be seeking information on the Irish Republican Army if they are on a news site, or they may want information on an Individual Retirement Account, if they are at a financial site. Therefore, what is needed is the ability to create specialized natural language knowledge to be able to better customize the query analysis for a given site or a given industry. There may also be times where even the particular site will not be definition enough of what terminology means. For instance, at the news site, it may not be clear which IRA the user is seeking, if there are recent news stories on both the Irish group as well as developments in retirement accounts. The present invention can utilize a number of techniques to address this issue. First, additional words in the query will help identify the context and meaning of "IRA." Personal data known about the user may help define what they most likely mean. The queries can be brought back for both interpretations under clear headings, and the user can choose the one of interest. On the search result side, the present invention can utilize additional search result scoring techniques to better refine the results for the users. The popularity search scoring techniques, as described in U.S. Pat. No. 6,182,068 is one such results enhancement technique that can be combined with the enhanced natural language search techniques of the present invention to narrow in on the needs of particular searchers. Another need is a way to group answers by topic, or guidance question, which confirms the user's query.

Finally, a web site, or other data collection, search system is needed that is tightly integrated with analysis techniques designed specifically to learn from the user queries, and activities based on search results. The analysis portion can be utilized to provide information to better communicate with the web site owner's customers, including providing insights into other communications such as brochures, ads, returns on standard web search engines, or other communications.

Therefore, what is needed is a web site search engine that provides improved natural language search functionality, while at the same time as providing the web site owner the ability to better refine its communications with users.

SUMMARY

The present invention is directed to the use of enhanced natural language searching to provide an improved information retrieval system for web sites or other information repositories. The present invention utilizes improved automation of naturalized language searching, combined with enhanced relevance assessment, to provide more accurate responses to users' queries. The process of automation involves both better dynamic interpretation of the user's query, as well as better data indexing to improve identification of related information. The present invention's main components are query and indexing analysis utilizing a Knowledge Repository to identify as completely as possible the words in a query or on a web page and appropriate variations or expansions of those words. Another component makes use of Templates that have pattern sequence components to be used to match Templates with the analyzed queries, as well as command components that can used to execute a search or other defined action. Finally, the present invention utilizes self contained analysis to help better understand the users, as well as continue to improve the system to provide better results for web site owners and their users.

The present invention utilizes the ability to interpret a query string to be able to better transform the question being asked into an actionable command. The present invention utilizes a template structure where a user query is matched against a template using the pattern sequence of the Template. The Template also contains a static search, or a dynamic search format designed to find information to answer to the user's query. The template can contain multiple searches commands to perform multiple actions. Having an analyzed query permits the Template to provide for dynamic generation of a search to attempt to respond to the query. The Templates of the present invention also utilize predefined searches, or static searches, that are designed to search for relevant data in response to anticipated queries. To the extent that a static or dynamic search are not applicable to a user's query, the present invention utilizes previous search techniques based on the analyzed query and refined index. Because of the improved token analysis of the present invention, both on the query side and indexing side, even traditional searches will return better results based on the improved search scoring techniques discussed below. For queries that are repeatedly entered and can not be matched to a preset or dynamic search, the analysis components of the present invention will assist the web site owner in identifying those queries so that templates can be generated for those queries. The present invention, in a further embodiment can suggest possible searches for the identified queries. This can be accomplished by using a series of preset structures and actually running the searches to provide information about what the results would be to the searches so that a designer can choose between options.

When attempting to match a user's query with a Template, the present invention may select more than one Template that appears relevant to the user's request. At that point, a matching factor will be applied to each search command that is executed. For instance, if a particular Template matching pattern sequence contains all key terms, it will be scored a higher match than if it had only two of three. This match score will be applied to the search command with the ultimate score for a result being a combination of the result analysis along with the referenced match factor. Because the selected Templates may be quite diverse, one embodiment of the present invention will return the results for each Template separately under a sub heading that defines the meaning encapsulated by the Template. In the example above regarding "IRA" the results for Irish Republican Army may be returned under that heading while the Individual Retirement Account results appear under a separate heading. The logic of the present invention, in one embodiment can be used to assess whether the results from one search Template are regularly ignored by users, thereby indicating that the particular search Template should not be used for similar queries in the future. Similarly, some of the multiple commands executed by a Template may be judged ineffectual and eliminated.

The dynamic interpretation of a user's query includes techniques to determine category and type of query, for instance whether the user is: seeking information, looking to take an action, or wanting to comment in a positive or negative way.

When performing a search of the data based on the user query, the present invention will apply a score or weighting to results to present the most relevant information to the user first. That scoring will be based on, among a few factors, the order and positioning of the pertinent search terms as found in the document. For instance, a query of "How do I open a retirement account?" will return a document/web page with a sentence discussing opening retirement accounts before it returns a page that merely includes all three terms "open," "retirement," and "account" on the same page, but with no particular relation to each other. This is possible because the indexing of the data in the present invention tracks the actual location of the tokens on a page, and the associated entity tags where indicative of synonyms, lexical phrases that have meaning, etc as those entities are described herein.

In an additional embodiment, the present invention also utilizes other prioritizing techniques to improve the ranking of results provided to users. A blended score using the scoring discussed above along with the popularity techniques of U.S. Pat. No. 6,182,068, incorporated herein by reference can provide more accurate responses to a user's search, by weighing into the equation the click activity of previous users entering similar queries on the same site. Additionally, to the extent that personal information is known about the particular user, that information or previous click activity can also be used to customize the ranking of responses to the individual, or type of individual. Personal data could be used for filtering results as well, such as returning salary information on employees to only certain key managers, or providing different information to users located in different locations.

In addition to improve searching based on an improved natural language search, the present invention design or modification of the Templates allows the owner of the web site to direct particular queries to specific information or actions. For instance, at a bank's web site, queries about how to check account balances, or transfer money between accounts may be left to the improved search technology of the present invention, where queries regarding the opening or closing of an account may be handled by voice over IP, chats, or other more personalized techniques. Also, if in answer to a particular question, the web site owner always wishes to display a certain page, the precise URL can either be the only result provided, or the URL could actually be activated taking the user directly to the page. In another variation, the web site owner could select one or more URLs to include in the search results. The URLs may contain dynamic elements parsed from the query.

BRIEF DESCRIPTION OF THE DRAWINGS

A better understanding of the invention can be had when the following detailed description of the preferred embodiments is considered in conjunction with the following drawings, in which:

FIG. 4 is a sample web page to be indexed by the present invention.

FIG. 5 is a sample of data contained in the index generated from the web page of FIG. 3.

DETAILED DESCRIPTION

Titles and subtitles used in the text are intended only as aids to guide the reader and as an organization tool. These titles are not intended to specifically describe the applicable discussion or imply any limitation of that discussion.

The present invention is a dynamic system for providing search, response to users, analysis, and improvement for web sites or other data repositories in an on-going fashion. The present invention utilizes preset and dynamically changing knowledge to focus on the proper response to each user query.

Figure 1:
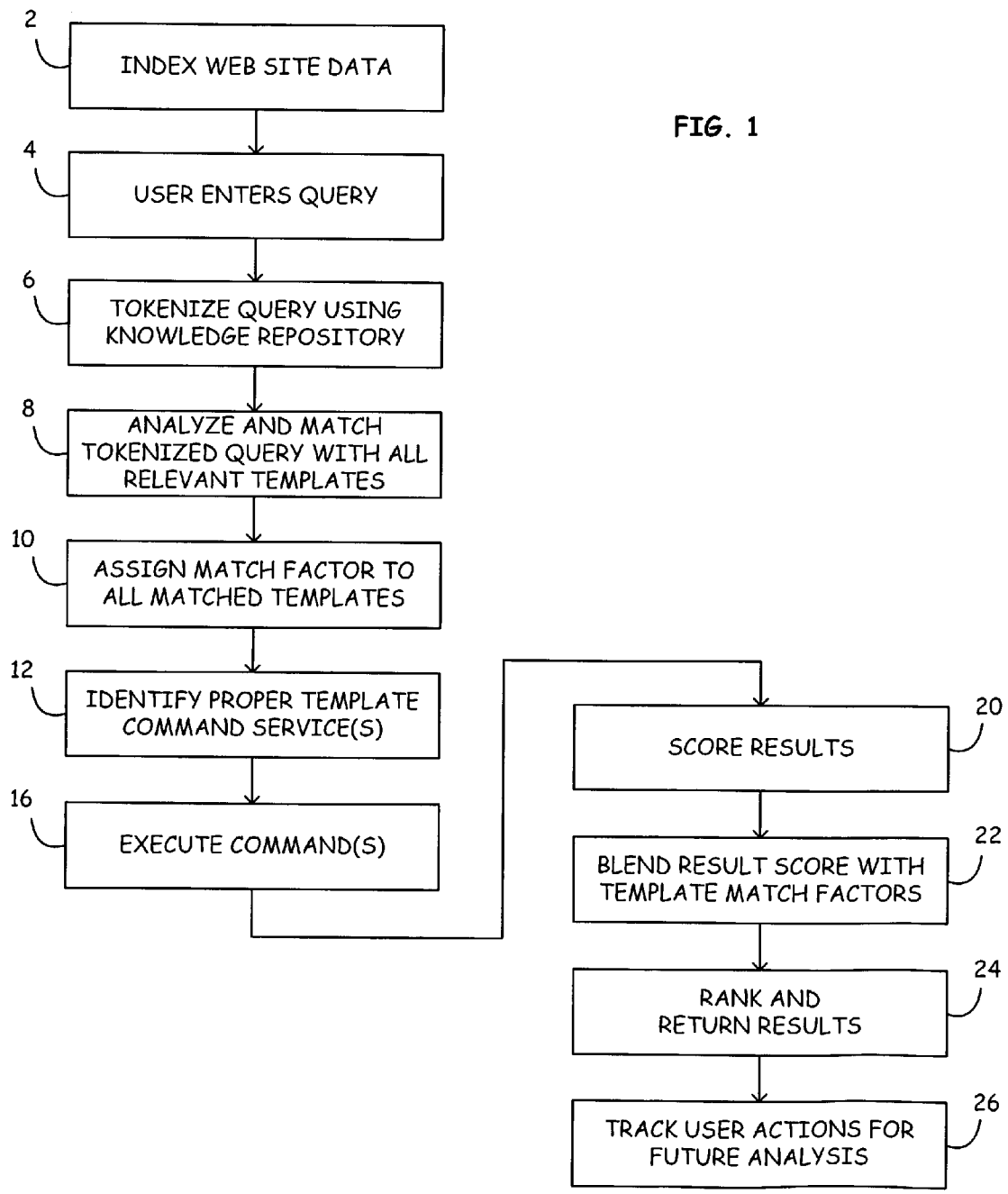
FIG. 1 is a flow chart of a preferred embodiment of the present invention.

The basic steps of the preferred embodiment of the present invention are set out in FIG. 1. In Step 2 the data of the web site is indexed. The indexing takes advantage of the Knowledge Repository of the present invention to add more intelligent indexing to improve search results. Once the web site is indexed, the system is ready to respond to user queries. Therefore, Step 4 is when the user enters a query. In the preferred embodiment the query is a natural language query. However, the present invention is perfectly capable of handling keyword searches or additional specification techniques using drop down boxes or similar tools. In Step 6 the query is tokenized using the Knowledge Repository of the present invention to interpret the query as specifically as possible based on the anticipated needs of the user. In Step 8 the tokenized query is processed to look-up and match entities, as well as identify all possible Template matches to the tokens and entities of the analyzed queries. In the present invention entities mean a pattern of data such as an email address, or a created grouping of data such as a group of words that are synonyms and the group is represented by an identifier. It is likely that more than one Template may be useful for a given analyzed query. The selected Template(s) is (are) then given a match factor in Step 10 which indicates how well the present invention anticipates that the selected template(s) reflects the user's query, in other words a confidence factor. In Step 12 the proper Template command service is identified to execute each command. In Step 16, each command is executed. Templates can contain commands that take a user directly to a specific URL, or in other embodiments possibly initiate voice over IP discussions, chat sessions, or other escalated communication with the user. Templates can also contain searches or combinations of searches and URLs. In Step 20 each result is scored, including any defined URLs from the Templates. Scoring can utilize any number of techniques, all designed to anticipate the relevancy of any given result for the user. In Step 22 the score for each result is blended with the match factor for the Template for which the result was returned. Step 22 takes into account that even if the data on the scoring techniques would have scored rather high, if it was generated from a Template that was determined to have a low match factor, overall ranking of the particular result should be lowered. In Step 24 the results are ranked and then returned to the user. In Step 26 the user's actions are tracked and sent to an external database for future analysis.

Figure 2:
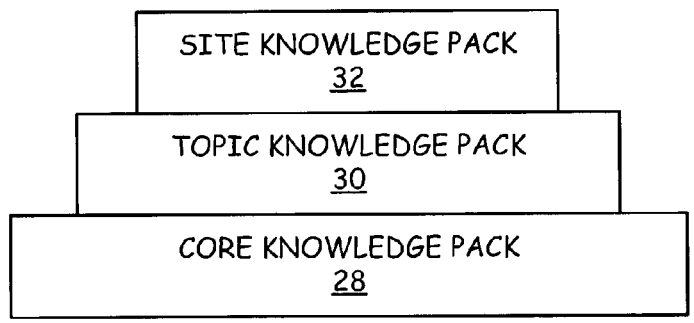
FIG. 2 is a diagram of the Knowledge Repository of the present invention.

FIG. 2 shows a depiction of the different knowledge components of the preferred embodiment. The present invention begins with a Core Knowledge Pack 28, which has basic knowledge functionality. For instance this could be a dictionary and thesaurus designed to identify common words and their possible contexts or synonyms. The Topic Knowledge Pack 30, can be supplied by the service provider, or customer, and is designed to provide enhanced terminology and specialized terms and word patterns that relate to a particular industry. For instance for the financial industry, IRA would be known to mean "Individual Retirement Account." Finally the Site Knowledge Pack 32, is designed to add any specialized terms specific to the web site or information collection itself. This Pack may also be wholly created or enhanced by the web site owner. Together, these sources comprise the Knowledge Repository 36 of the present invention. The Knowledge Repository 36 is used both during the interpretation of a query, as well as during the initial, and subsequent, indexing of the data. The use of the Knowledge Repository 36 during data indexing may enhance the responsiveness of the overall system.

Figure 3A:
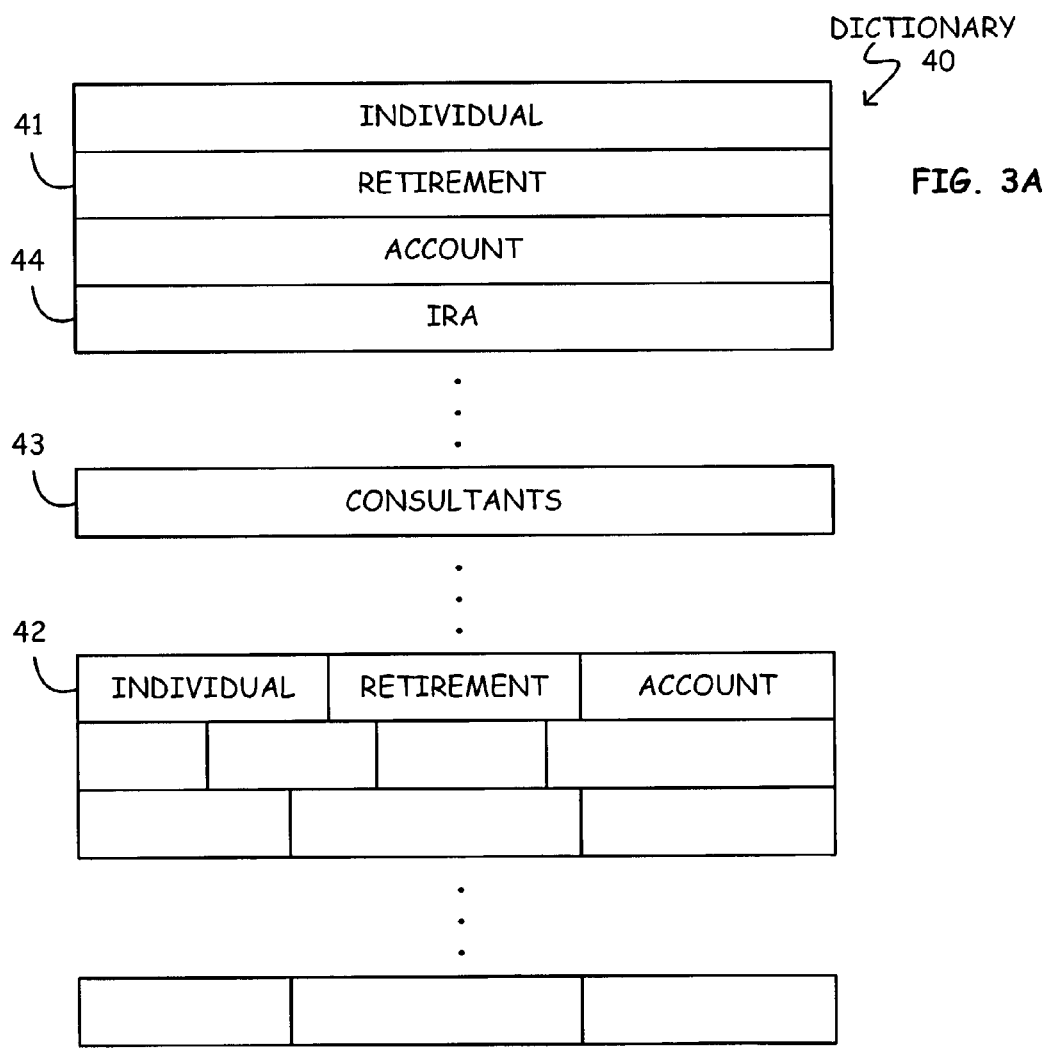
FIGS. 3A-3D are examples of analysis tools of the Knowledge Repository of the present invention.
Figure 3B:
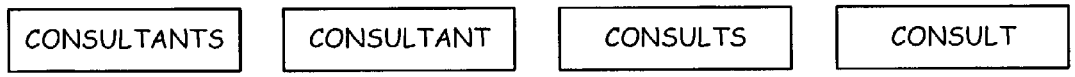

With respect to the document indexing Step 2 of FIG. 1, the present invention first utilizes standardized technology to spider a web site to determine all the pages on the site, and a unique identifier for each of those pages. The indexing process first identifies all tokens for every identified character string in the collection of web pages. This process utilizes finite state automata to identify specific words, multi-word tokens such as "individual retirement account," and common word misspellings. The present invention identifies the finite state automation tool for the indexing process as the document processor. The document processor also identifies the position of each token and entity tags on the page, as well as includes token spacers to identify sentence and paragraph breaks to assist the proximity locator in later searching. Entity tags are used where the word is not actually present, but instead a representation of the entity is present. In the index, they are tracked in similar fashion. The tokens are identified using the Dictionary 40, shown in FIG. 3A. The Dictionary 40 is part of the Knowledge Repository 36, and may be highly customized not only for the industry, but even the site. Each character of a web page to be indexed will be processed through the document processor, where character patterns, even those including spaces, will be recognized against the Dictionary 40. Each token identified as being contained in the Dictionary 40 will be given an associated Dictionary identifier (ID). Words from the index that are not found in Dictionary 40 will be given an ID of zero. These can be provided to the content editor of the Knowledge Repository 36 to determine if they want to update the Dictionary 40 to include the unknown words. Dictionary 40 contains Single Word Tokens 41, such as the word "retirement" and Lexical Phrases 42 such as "individual retirement account." The document processor, when processing the string of characters making up the Lexical Phrase 42 "individual retirement account," will recognize the phrase as a whole, as well as each Single Word Token 41 contained in the phrase. The Dictionary 40 of Knowledge Repository 36 contains an identification of Stem Words 43 that are subject to stemming and will associate those potential stems with the token listed in the Dictionary 40. In the example in FIG. 3B the word "consultants" is identified by Dictionary 40 as having stems including the word "consultant," the word "consults" and the word "consult." This will mean that if a search command is issued against the data for the word "consult," any indexed page containing the word "consultants" will be returned. For that matter pages with "consults" and "consultant" will also be returned since "consult" is the Highest Order Stem 44. The present invention includes within the stemming process, lemmatization as well. Lemmatization finds the headword from the inflection. For example, the inflection "consulting" is lemmatized to the headword "to consult." When stems, or stemming is referred to herein, it should be understood to include lemmatization as well.

At this point, the process of indexing has tokenized the data into normalized stem forms. Normalized stem forms can be passed through the present invention's matching network to locate synonyms and hyponyms associated with the identified tokens, and also to identify semantic patterns, and data patterns to identify entities.

Figure 3C:
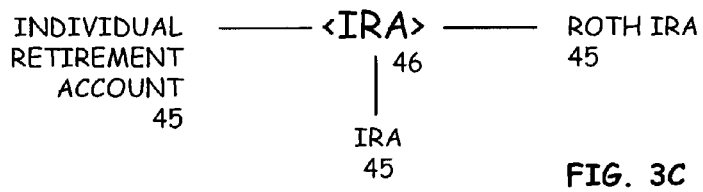

Look-up tables associate any synonyms or hyponyms with the tokens previously identified using the Dictionary 40. The look-up tables are part of the Knowledge Repository 36. As an example, the token "computer" may be identified as having synonyms (e.g., PC, personal computer, laptop, desktop) and hyponyms (e.g., Dell Inspiron 3700, MacIntosh iMac, etc). Therefore the token "IRA" is identified as a Synonym Word 45. FIG. 3C provides an example of indexing where the document processor accounts for synonyms. In FIG. 3C the Synonym Words 45 are grouped together to form a Synonym Word Group 46. In this specific example, Synonym Words 45 are "individual retirement accounts," "IRA" and "Roth IRA." The Synonym Word Group 46 that has been created is titled <IRA>. The document processor can then go through and for every instance where a Synonym Word 45 appears it will also index the corresponding Synonym Word Group 46 at the same location. While the Synonym Word Group 46 is not a natural word, in the later discussion of query processing, it will become clear how the query matching generates Synonym Word Groups 46 and how Synonym Word Groups can be matched to indexed data. This synonym matching process includes matching hyponyms, which while not precisely synonyms, are related enough that the designer wishes to associate the words. For instance "oak" and "maple" are hyponyms of "tree."

Figure 3D:
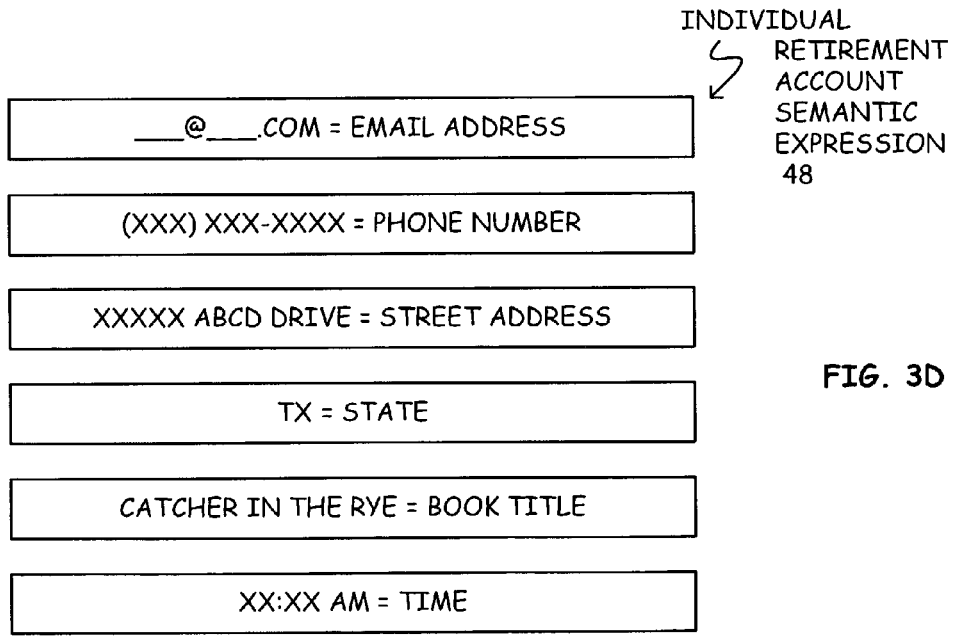

In FIG. 3D, examples of an additional document processing technique referred herein to as Semantic Expression 48 is shown. In this form of indexing the document processor is looking for recognizable patterns so that it can identify a pattern as an entity. For instance, the format of an email address can be identified and can be indexed as an email address for the particular page. The same can be the case for phone numbers, street addresses, state designations, time and the like. Other unique types of designations could also be included, for instance, identification of book titles by the way the word groups are presented. In an additional preferred embodiment, the Semantic Expression 48 to the extent possible, could also be able to identify who the email address is for, or what the phone number is. For instance, if a user was searching for the phone number of the Kansas City store of a particular company, it would be a more satisfying user experience to return the Kansas City phone number versus all phone numbers that appeared on the company's web site.

The document processor through the processing described above has identified each token and token spacings to allow for more intelligent searching. FIG. 4 demonstrates a particular page on the hypothetical web site www.financial.com. This page shows that the document processor has already gone through and identified Token Positions 35, represented by the numbers over each word or piece of data. It will be noted that where the document processor has identified a paragraph break, it includes a <paragraph spacer> 37 which effectively adds space between words so that a proximity search in the future will know there is a paragraph break. The document processor does the same thing when it identifies a sentence end by adding a <Sentence Spacer> 39. Finally, FIG. 4 demonstrates the identification of an entity that the document processor found during the entity matching process. The Entity Break Lines 38 are shown in the example around the web site link.

At this point, the document processor through use of Knowledge Repository 36 has completely indexed the data it has found in a very comprehensive way so as to make the index itself quite intelligent.

FIG. 5 provides a simple example of the data stored in the index of a preferred embodiment. While data could be stored in any format, FIG. 5 shows an index of a preferred embodiment that has been created after the document processor has performed all steps of indexing utilizing all components of the Knowledge Repository 36 as demonstrated in FIGS. 3A through 3D and FIG. 4 above. As can be seen in the index, individual tokens such as "IRA," "Individual," "Retirement," "Accounts" and "Roth" are indexed not only for the page on which they appear, but also for the Token Place 35 that they occupy. Additionally, the index includes Lexical Phrase 42 "individual retirement accounts." The document processor also properly identified each occurrence of an entity tag such as for Synonym Words 45, from our example in FIG. 3C, and indexes them as an entity tag for the Synonym Word Group 46 <IRA>. Finally, the document processor recognizes the entity tags for Semantic Expressions 48, in this case, the link at the bottom of the page shown in FIG. 4, which is indexed as a URL. In a further preferred embodiment, the URL could be further defined as an IRS URL.

Once the initial indexing of Step 2 in FIG. 1 is complete, the present invention is ready for query processing. As new data is added to the web site, or information repository, or as the Knowledge Repository 36 is enhanced, either automatically or through administrator input, indexing can be performed again to ensure maximum accuracy within the index. If the Knowledge Repository 36 has been updated, the entire data set should be re-indexed. If only new data has been added to the site, the preferred embodiment indexes only incremental data. As will be clear to the reader the better the Dictionary 40 and other related components of the Knowledge Repository 36 are, the better the index will be, as well as the better subsequent processing and matching of queries will be.

To tokenize the query entered by the user in Step 4 of FIG. 1, and to entity match and subsequently match the analyzed query to the proper Templates, the preferred embodiment utilizes the components of the Knowledge Repository 36 in a very similar way that the indexing process did. The present invention expands the context of the query into an array of possible interpretations, to generate a search or action that will better respond to the user's query. Steps 4, 6, 8, and 10 of FIG. 1 are described in more detail in FIG. 6, the corresponding steps of FIG. 1 are listed down the left side of FIG. 6. First query tokenizing occurs, just as it did for the data being indexed. In Step 50 of FIG. 6, the end user enters a natural language query. In Step 52 the query is processed against the Dictionary 40 so that all tokens are identified, this includes Lexical Phrases 42 and common misspellings as discussed above for FIG. 3A. In Step 54, tokens are associated with discrete Dictionary entries. In Step 56, the system analyzes the tokens associated with the Dictionary entries to identify any Stem Words 43. The query processor then replaces the token with a stem associated with the Dictionary 40 entry for that token.

Figure 6:
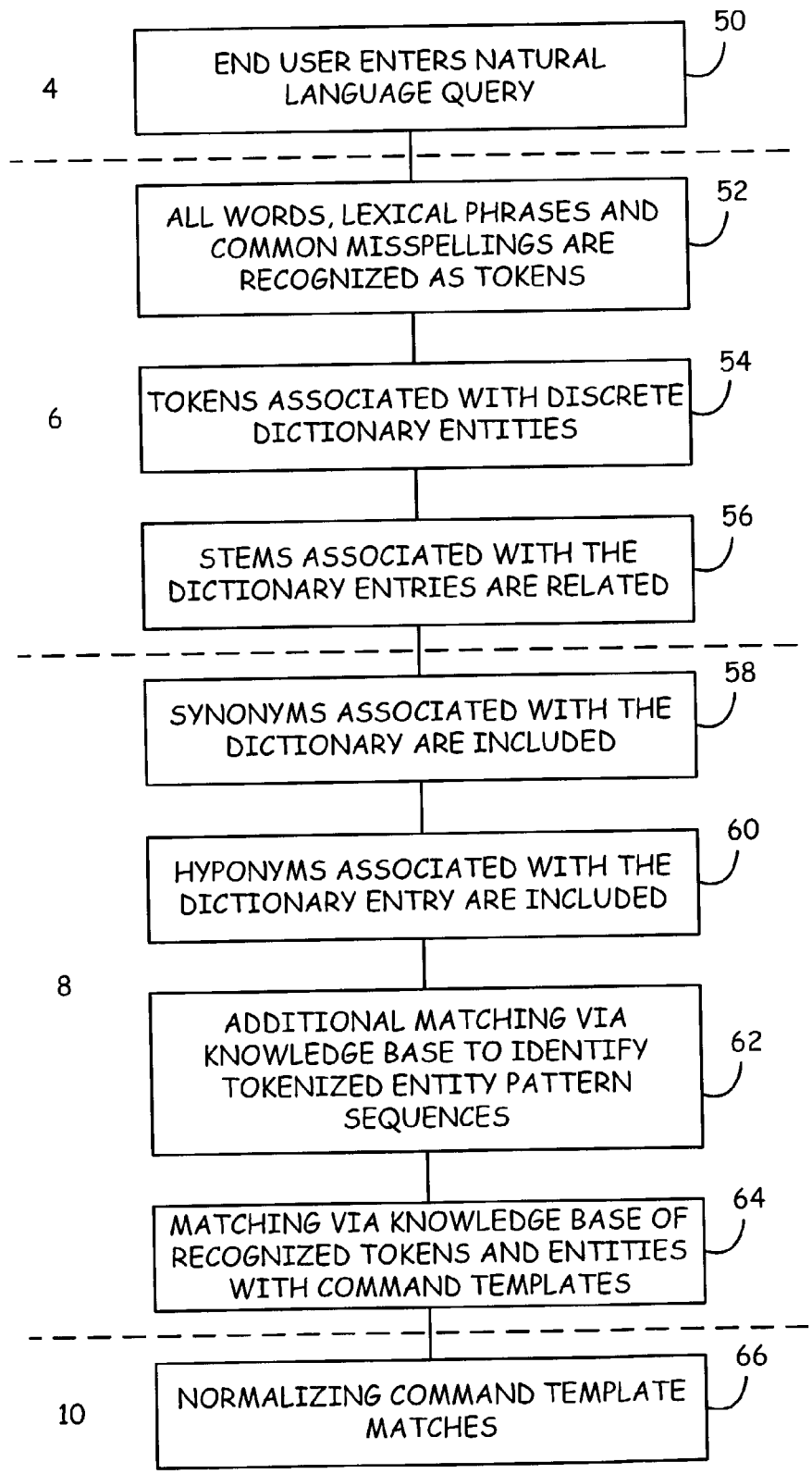
FIG. 6 is a flow chart of the query analysis of the preferred embodiment of the present invention.

At this point in FIG. 6, the query has been tokenized to normalized stem form. Steps 58-64 corresponding to Step 8 in FIG. 1 will now pass the query through the matching network, which for the query, will include identifying all possible Template matches by comparing the analyzed query to the sequence patterns of the Templates. In Step 58 the tokens are expanded using Synonym Word Groups 46, by looking up all tokens against the synonym look-up table of the Knowledge Repository 36. This process involves identifying any tokens that are listed as Synonym Words 44 in the look-up table. The query is modified to include the Synonym Word Group 46, in addition to the actual word. (In practice, it has been found that results that have the actual word rank higher than results that match a different word from the Synonym Word Group 46.) Pursuant to the content manger's choice, the Synonym Word Group could replace the token that was listed as a Synonym Word 44. In Step 62 the same process as Step 60 is utilized to identify tokens subject to hyponyms and to modify the query accordingly. In Step 62 the present invention matches the query against the Knowledge Repository 36 to identify entity pattern sequences, such as email addresses or identification of types of things such as place date, etc. In Step 64, the fully analyzed query is matched against Templates by comparing each token to a sequence pattern of a Template. The sequence pattern of the Template is designed to cover possible variations of a query, while still being precise enough to answer the user's question. A Template may have more than one sequence pattern. More than one Template may be selected based on the query tokens meeting the sequence criteria of numerous Templates. The sequence patterns of the Templates are preferably designed to recognize multiple ways of expressing the same question, for instance "Who is XXX" and "What is the name of XXX." In the present example, a sequence pattern of a Template may identify the terms "who" and "what" as optional terms, but require the presence of "XXX." In that instance, both queries would match the same Template. A different template that just had "XXX" as a required field would also match the query. Finally, a different Template that included "XXX" as an optional term would also be matched. In the query "How do I open an individual retirement account?" will match templates that include sequence patterns for the stem <open> and for the Synonym Word Group <IRA>. A Template that requires both the word "open" and an account type, would be matched as well. A Template that required an action, and the term IRA, would also match. Finally a Template that required the word "open" and the term "individual retirement account" would also match. As will be clear to one of ordinary skill in the art, the process of creating a set of Templates to properly provide sequence patterns to match queries from users is important to improving the results of entered searches. Ideally, a number of Templates will be matched so that the present invention will have a number to choose from to better match a user's query. The present invention then normalizes or scores the confidence level that the matched Template(s) actually represent the User's query.

Step 66 of FIG. 6 includes, in the preferred embodiment, normalizing the matched Templates to assign a Match Factor by comparing the words and tokens of the analyzed query entered by the user to the sequence patterns of matched Templates. Templates with sequence patterns that have more required words matched by the analyzed query will score higher than those with less required word hits. This is because the more detailed the corresponding search can be, while still meeting the elements of the query, the more likely a valuable result will be returned. For instance a sequence pattern that just had account, would score lower than one that matched with open, IRA, and account. Optional words generally will not impact the Match Factor, unless all other factors are the same. For instance, on the Template with just account, if the optional words were open an account and the sequence pattern of that Template had Close while a different Template had Account as required and open as optional, the later would receive a higher Match Factor. Additionally, precise matches to the original words of a query will provide a higher score, in the preferred embodiment, than other words from the Synonym Word Group 46. The generation of a Match Factor is very subjective, and may be different for each site. The Knowledge Repository 36 will store any algorithms, such as those just discussed, to be used to generate Match Factors. In embodiments of the invention designed for other languages, the system will need to account for different query terms, as well as semantically account for the different structure of questions in those languages.

Figure 7:
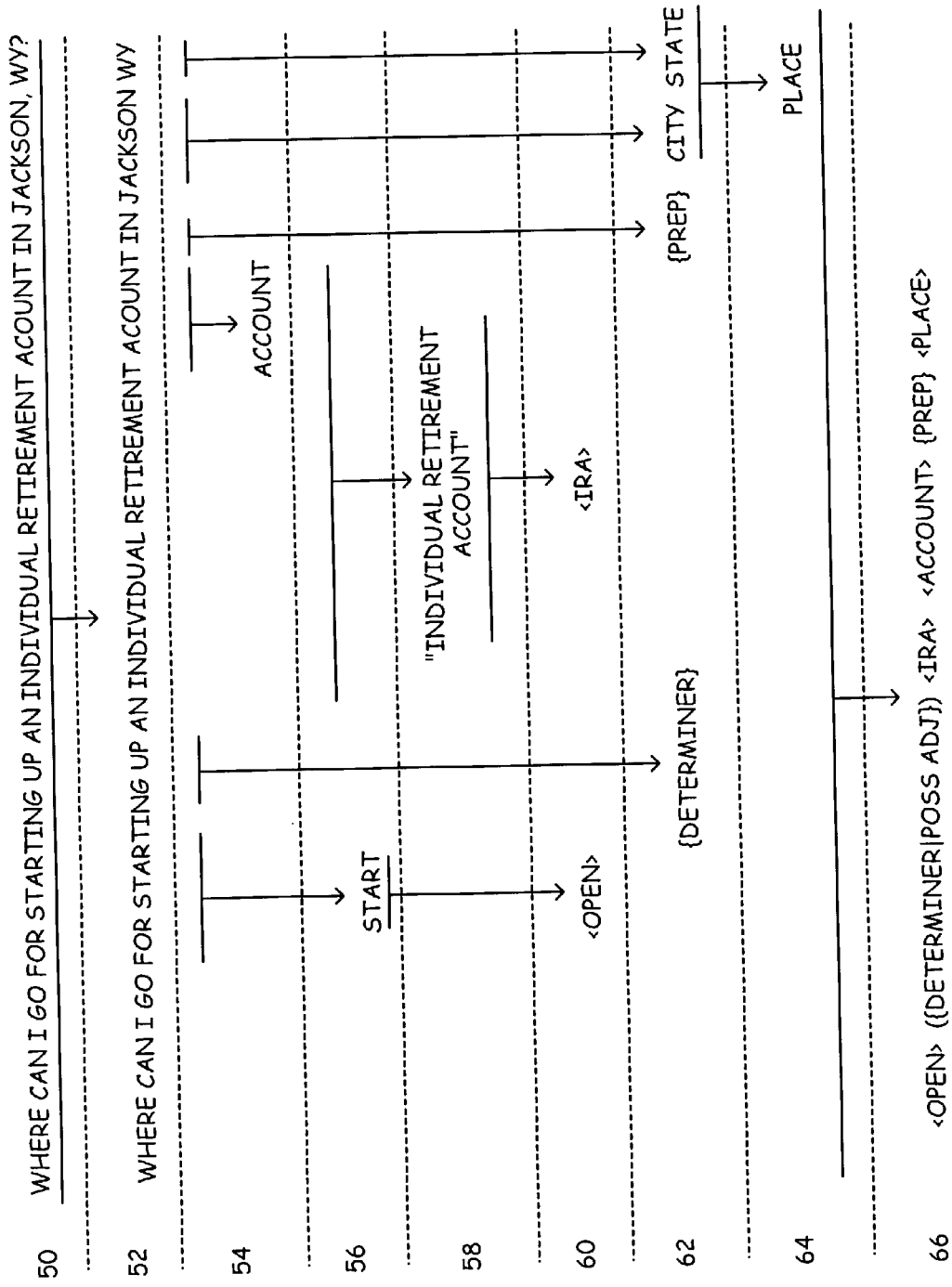
FIG. 7 is a sample of query analysis of the preferred embodiment of the present invention.

FIG. 7 demonstrates a specific example of the flow chart of FIG. 6. In FIG. 7, the user query, 50 is, "Where can I go for starting up an individual retirement acount in Jackson, WY?" In Line 52 the query processor processes each character string to identify separate character strings. In Line 54 of FIG. 7, tokenization begins and the word "acount" in the query is identified as being a misspelling of "account" utilizing the Dictionary 40. In Line 56, the phrase "starting up" is identified as being a Stem Word 43, in the Dictionary 40, and the associated stem "start" is selected. In Line 58 of FIG. 7, the Lexical Phrase 42 "individual retirement account" is identified as being contained in the Dictionary 40, therefore the tokenized query will utilize that Lexical Phrase, rather than the individual words. With the tokenization complete, Line 60 begins the look-up and entity recognition process. Synonym Words 45 are identified, and the present invention selects the appropriate Synonym Group 46 to represent those tokens as well. "Start" is a Synonym Word 45 in the "<open>" Synonym Word Group 46, while "individual retirement account" is a Synonym Word 45 in the "<IRA>" Synonym Word Group 46. By selecting the Synonym Word Group 46, the query becomes more powerful because it can seek the information needed by the user without being limited to the more limited phrases the user selected. In a preferred embodiment, the query could also contain the actual term "individual retirement account" as well, and in fact, when Match Factors for Templates are being generated, preferably Templates with the actual term will score higher than words from the Synonym Word Group 46.

Lines 62 and 64 utilize pattern matching and semantic expression recognition to further define terms in the query. In this instance the word "an" is identified as a {determiner} while "in" is defined as a {prep}. Additionally, "Jackson" is identified as a <city> while "WY" is recognized as a <state>. The present invention then identifies the <city><state> combination as referring to a "place." Line 66 represents the analyzed query, "<open>({determiner|poss adj})<IRA> <account> {prep} <place>," which will be used for template matching.

At this point in the example of FIG. 7, and at the end of the flow chart in FIG. 6, the present invention's matching process for finding all applicable Templates is already going on as part of the matching process. Referring back to the overall flow chart of the preferred embodiment in FIG. 1, Step 8 includes the process of matching Templates using the sequence patterns. The process of matching analyzed queries to Templates and creating the corresponding Match Factors (Step 10 of FIG. 1), have been discussed in detail above.

Step 12 of FIG. 1 relates to selecting the proper Template command service to execute the commands of the matched Templates. In the present invention a Template structure is utilized that contains commands as well as sequence patterns. Once a Template is matched, it has pre-determined actions included in it. The action or command portions of the Templates can comprise predetermined or dynamically determined action sets in response to a query. The commands, in a preferred embodiment, take two forms: specific URL(s), or search command(s). The specific URL(s) may be used by the owner of the web site if there is particular information that the owner wishes a web site user to receive in response to a specific query. The command structure can contain URLs, that may have accompanying titles and abstract, along with score factors, searches, or both. As in the example of FIG. 7, if there is a query related to opening an account, the owner of the web site may wish to direct the user to a special offer page to facilitate getting the business. The corresponding Template could contain the single URL of the offer page, and also force a high score for that URL. The owner could set the system to utilize Ask Jeeves Active Answers to automatically open URLs if the score for a URL exceeds a certain threshold value point. The Template could contain a number of URLs that are to be included in the search results, but will be scored with other results from other actions taken by other Templates. In a further preferred embodiment, the web site owner may wish to directly engage the user, and therefore may start a voice over IP conversation, a web chat, or other direct communication means to engage with the user. The second command type is a search command. This type of command will cause a search against the site, or information repository, to be issued based on the search parameters contained in the Template.

A search command in a Template can be generated dynamically, or can be static. For instance, a Template designed to address the example query could be set to a static search for the terms "<open>" "<IRA>" and "account" all in the same sentence, or in close proximity. The search could further define a specific order in which the terms must appear. Note that this static search does not address the issue of place, Jackson, Wyo. While theoretically, there could be a Template that perfectly matches each and every possible query, that is simply not practical. A dynamic rendition of the same Template could fill in dynamically key terms such as the action desired, i.e., <open> or <close>, and the desired type of account, <IRA>. This will simply provide the structure and allow the analyzed query information to dictate what the actual search string will be. The dynamic search is much more flexible and can cover queries related to different account types and actions without restructuring the search. However, even the dynamic search string as described did not address the place requirement of the example query. However, because the use of dynamic searches reduces the number of Templates necessary to respond to most queries, an additional Template could be added that uses the same dynamic search, and also dynamically allows the inclusion of a place. In an additional preferred embodiment, the dynamic search could allow other terms identified as required terms by other Templates to be added dynamically to a search string in either "AND" Format, or in some form of proximity search.

Once all the proper command services are selected in Step 12 of FIG. 1, the commands of each Template are ready to be executed in, Step 16 of FIG. 1. If no Command Templates are matched, the preferred embodiment can revert to a form of key word or traditional text-based search based on the analyzed query. The user will still gain the benefit of the expanded scope of using synonyms and the like in this process. If the query is entered by additional users, the present invention can create a message to the administrator, either at update points, or in real time, that a Template to address that query may be needed. In Step 16, each command is executed, including executing searches against the index. Searches of the present invention can utilize powerful commands as a result of the intense indexing as well as understanding of all information on the site and in the query itself. Some of the unique operands and proximity operators, as well as token identifiers are described in Appendix 1. Additional specific operands may be created by future users based on the knowledge of all indexed terms and where each corresponding token is located, as well as the analysis that is performed on the query.

In Step 20 of FIG. 1, each result is given a score, based on its expected benefit to the user. One factor in scoring in the preferred embodiment is to look at whether all search terms appeared in the order requested, and if they were in close proximity. The more search terms, in the proper order, and in close proximity a result has, the higher score it will receive. The scoring can also utilize reverse frequency analysis to determine a weighting for each token. One embodiment utilizes an industry standard TFIDF algorithm (Term Frequency-Inverted Document Frequency). A TFIDF value is calculated for each term in the index table and is stored in the Keyword Snapshot, that is discussed later. This algorithm is basically designed to calculate the following formula: Number of Occurrences of term XXX on returned page/Number of Occurrences Across the Entire Site. After the TDIDF value is calculated, a vector table is created from the index table. The vector table holds a vector for each document. Specifically a document's vector contains a value for each term in the index table. This value will be the TDIDF weight of the term if the term is found in the document, zero otherwise. Finally, each document's vector is normalized to unify length. Over time, the weighting can be customized to better reflect the needs of users. In another embodiment, the frequency is judged across the site or across the Internet as a whole. For example, if a token appears frequently on the site, such as the words "a" or "which," then that token would have less weight than a word appearing less frequently, such as "IRA." This weighting can be further refined by comparing frequency of the token on the Internet as a whole, so that a token appearing much more frequently on the site than on the Internet as a whole (such as a financial term on a financial site) would receive a higher value than a token that always appearing frequently.

Other standard techniques of ranking results can be applied as well. For instance in a preferred embodiment, the popularity ranking of U.S. Pat. No. 6,182,068 can be used in addition to help rank results. The more standardized techniques could also be used instead of any weighting analysis set forth herein.

Before results will be returned to the user, the preferred embodiment in Step 22 of FIG. 1, creates a blended relevance score for each result based on the Match Factor of the Template that led to the result, and the score of Step 20. In another embodiment, Step 22 could be bypassed and the score of Step 20 would be used to display results. Once all the blended relevancy scores are created, the results are ranked and returned to the user as in Step 24. In Step 24, results from different Templates may be mixed together throughout. Another preferred embodiment would skip the blending step of Step 22 and display the results from each Template separately. The first set of results to be displayed would be from the Template with the highest Match Factor, and the first result in that group would be the result with the highest score from Step 20. The sets of Templates and results within each would be sorted from the highest Match Factor and score, respectively, to the lowest. In this embodiment, each Template could have a descriptive query associated with it that defines for the user what that search attempted to find. That descriptive query could be displayed as a header for the results from that Template. The number of results under each heading could be set by the web site owner. Additionally, the descriptive query could be set up to be dynamic in a way similar to the searches where, for instance, certain tokens from the query are inserted into blanks to complete the descriptive query. As an example, the descriptive query could read "How do I <action> a <account type> account? Where the <action> and <account type> will be filled in from the tokens and entities of the analyzed query.

Once results are displayed to the user, the present invention tracks the user's interaction with the results for future analysis, Step 26 of FIG. 1. The processed data is stored in an External Reporting Database (ERDB). The type of data that is stored can include: what was the original query from the user, what was the analyzed query of the present invention, what Templates were matched, what was the specific interaction with the results, whether the user opened the first result and no more (indicating he/she found her/his answer), whether the user skipped many results, and whether the user opened results and abandoned them to look at others. One of the advantages of the present invention is an integrated analyzer that will provide automated and customized reports regarding the system's performance, potential enhancements to the system, potential improvements to external communications of the web site owner, and potential modifications to the web site itself, to name a few. During the process of analyzing the user's query, interpretation techniques are preferably used that can determine if the query is seeking information, seeking action, or requesting help, and whether the tone of the requests is positive or negative. That information can be gathered in the ERDB as well to provide new insights into users' experiences with a web site beyond standard Customer Relationship Management tracking that merely records events on a site, but does not measure the intent of the users in any way other than by speculation by operators reviewing the data later.

Some examples of use of the analytical aspects of the present invention are determining whether new advertisement campaigns generate particular types of questions at the web site so that future communications can address the potential gaps in information. If the data indicate that users are not finding the results they are looking for, various steps in the process can be modified to improve the implementation. For instance, the analysis of the original queries could be adjusted. The matching of tokenized queries to Templates could be adjusted. Different scoring of results could be used. The Knowledge Repository 36 may need to be enhanced to better recognize unique issues for the particular site. Much of the analysis is automated in the preferred embodiment. The analysis can be reported at regular reporting cycles, or can provide real time messaging and interrupts. When queries are repeatedly not being matched with Templates, there is a need to create additional templates. In a further preferred embodiment, the analytical engine could recommend a new Template for the editor/administrator's review.

The process of creating Templates can be performed in a number of ways. A content administrator may decide to create a single Template to attempt to fill a perceived need. In a preferred embodiment, the content administrator would input a question. This question will become the canonical form and be used as the guidance question text in the user interface and used as the name of the Template. The content administrator then enters one or more paraphrases, which are different ways to say the same question. Depending on user preferences, each paraphrase will use entities to broaden to the highest abstraction layer either automatically or with prompting for choice. For instance, "How do I open an account?" is broadened to "How do I <open> a/n <account>?" To create the sequence pattern that will ultimately be used to match against the Template, the question is "fuzzified" and has other forms created to create one or more sequences for matching. For instance, "How (can|do)? I? <open> {determiner|possessive} <account>" or "What is the best way to <open> {determiner|possessive} <account>." With the sequence pattern selected, the content administrator can then create the Template commands associated with the sequence pattern. Default search expressions are built. In one embodiment, these can be created by using smart natural language question stripping, such as "SEARCH(+<open>+<account>)." The system of the present invention has been able to perform these steps automatically up to this point. To refine the command, the content administrator can either use an administrative user interface to point the system to the best response to a query or end user click popularity can be used to identify the best result. From that, the words are analyzed on the "best" document versus those on other documents rated more highly. In other words, pick the best document from all known pages on the web site and run searches and modifications to searches to iteratively bring the chosen document to the top, or near the top, of the rankings. Additional terms and entities can be added (or subtracted using the logical "NOT" operator) to make the chosen document rise to the top. This should beneficially help all similar documents rise to the top. (Essentially "more like this"). Similarly scoring heuristics can be iterated with this information.

The content administrator can also create a large number of Templates at once. This could be performed at regular times as part of the overall analysis work on the site. This technique harvests the queries used on the site to assist in the Template creation. Logs of vast numbers of queries (the more, the better) are processed and binned according to question form and entities in the questions. While the number of unique questions is essentially infinite, the course forms are relatively few (<50) to bin a high fraction of all queries. Within these bins, the queries can be sorted by what entities/tokens appear. (The opposite is also useful. Bin by entity and then sort by question type "What is a _____"). In this way, the most commonly hit question type and content can be chosen. This can be done either automatically by frequency threshold or by the content administrator. The highest frequency occurrence of an exact question form from within a bin can be used as the canonical form to be used as the representation of the question to the end user, i.e., the Template question text. Other heuristics can aid this process also such as: favor shorter or longer forms; favor preferred tenses; favor active or passive forms; discount poorly spelled queries; boost properly punctuated queries slightly; favor proper grammar; favor full forms over abbreviations etc. Although, there will be only one canonical form, sequences will be built for each different form harvested.

Consider, for example, the following example query forms:

Who is the president of the us
What is the name of the President of the United States
Who is the president of the US?
Who us president The third choice wins on capitalization, punctuation and grammar. The "US" is expanded to its full form after lookup in the dictionary and the present invention provides "Who is the president of the United States?" The different canonical forms can be used as a basis for creating sequence patterns for Templates. These can additionally be processed with a set of substitution rules to further broaden the forms. The rest of the process follows that of single template creation process.

Flags, which are logged with each query, can be associated with each Template, so that the query can be further categorized for later analysis. For example, questions about troubleshooting can be categorized as "Support:Troubleshooting" queries. Templates can be made purely for logging purposes—for example, a Template could include sequence patterns of swear words or other words indicating that the user is angry. The Template does not have to have an associated search, but simply has a flag that will be logged along with the query. As a result, templates can improve search results, the user experience (with the grouping of search results under different guidance questions), and analysis.

While creation of additional Templates can improve searching, other modification of the Knowledge Repository may also provide good improvement. During the analysis of the users' queries, if words that do not match the Dictionary 40 or any other elements of the Knowledge Repository 36, the Knowledge Repository 36 may need to be enhanced to address the users' queries more accurately. During indexing of the web site, to the extent that words are identified repeatedly in the index that do not appear in the Knowledge Repository 36, additions to the Knowledge Repository 36 may be needed. One other important analysis aspect is when the Templates used have a high Match Factor, indicating strong confidence that the user's query was properly interpreted, but the search results are returning very little data, this may be an indication that the web site owner's site is deficient in information that its users need.

A further feature of the present invention is the ability to provide titles and summaries of the web pages with the results to indicate to the user what those pages may contain. Of course, each page can have a static title and summary included in a metatag or other technique. However, in the present invention, a title and summary can be generated dynamically. Because the present invention understands the structure of each page, that knowledge can be used to identify what is most likely the title of the page. Dynamic generation of the summary, can be based on the actual query. In the example query related to IRA accounts, the summarizer of the present invention can look for the sentences that discuss IRA's to use as a summary of the page, irregardless of whether there is other content on the page. In response to a query regarding "checking accounts," the same page may be summarized with completely different sentences related to "checking accounts." Therefore the summarizer of the present invention can adjust the presentation of the information to the user responsive to what they are seeking. The summarizer of a preferred embodiment looks for entities that contain the maximum number of tokens in the query and selects those entities to be the summary. In this embodiment, the tokens in the sequence pattern could be highlighted, or the raw search terms could be highlighted. Another embodiment would provide a certain number of words on either side of each query token located on the webpage as the summary. Once summaries and titles are created for responsive data, a preferred embodiment of the present invention can prevent results with the same title and summary from being presented in the same results list. This addresses the problem of the fact that the same web page can be reached in numerous ways, and may have a number of unique URLs as a result. Finally, if the dynamic summary creation is not returning better summaries than the static summaries attached to the page, the feature can be disabled.

The analyzer aspect of the present invention can track the response to different summaries. If the summarizer of the present invention provides summaries that are of interest to users, that information can be used by the web site owner to attempt to optimize its responses in general web searches possibly improving its ranking in those search results. An interesting component of the analysis of the summarizer, is that information where the data of interest to users is found on each page, can inform the web site owner if the pertinent information on a given page is buried in the middle of information of less interest to its users.

Figure 8:
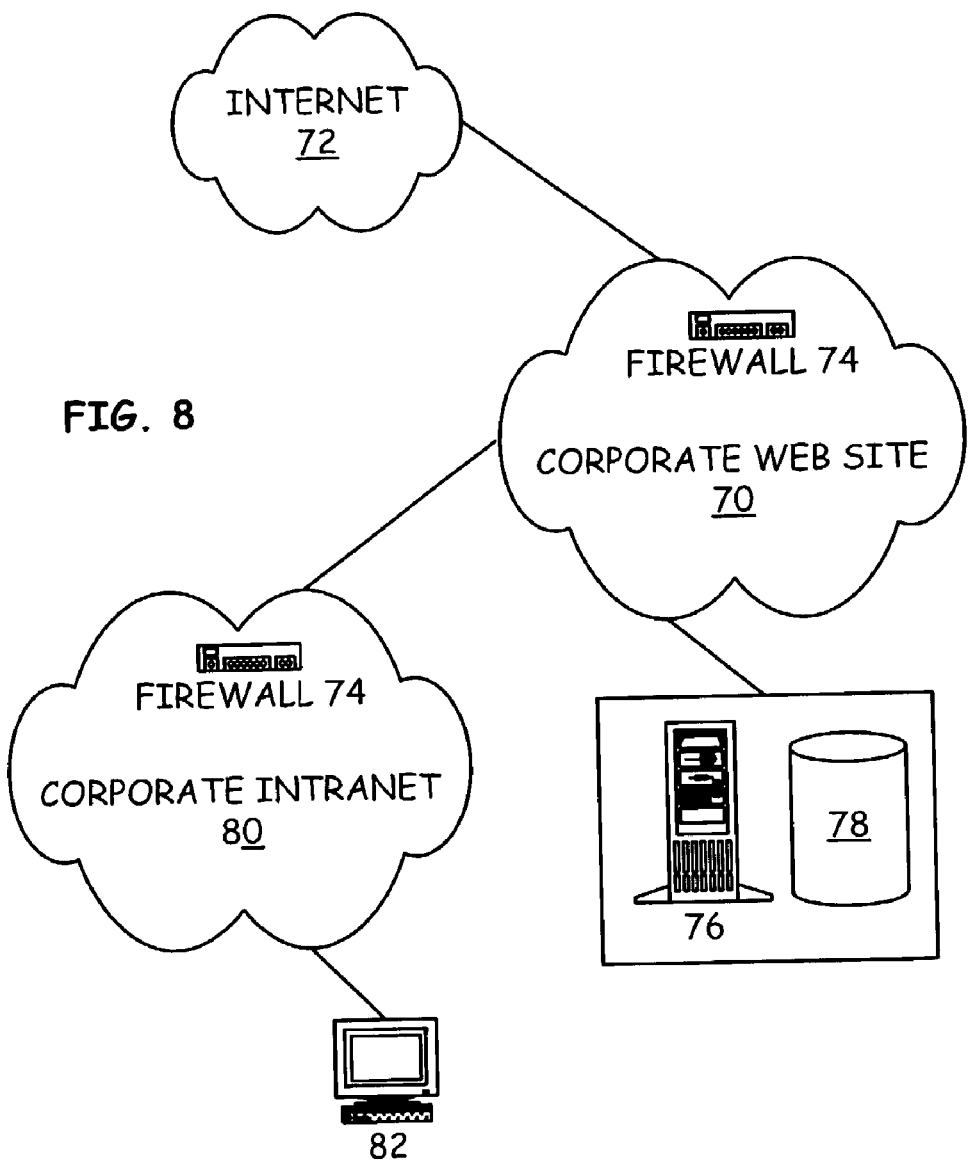
FIG. 8 is the configuration of the preferred embodiment of the present invention.

In light of the previous detailed description of the functionality and programming of the present invention, it will be clear to those of skill in the art that there are a number of ways to implement the system on a corporate web site. The preferred implementation in relation to the corporate web site and the rest of the Internet is shown in FIG. 8. The preferred implementation has Corporate Web site 70 connected to Internet 72, through firewall 74. Behind Firewall 74, connected to Corporate Web site 70 is Server 76 and Databases 78 of the present invention. Corporate Intranet 80 is also connected to Corporate Web site 70 through another Firewall 74. Connected to Server 76 and Databases 78 of the present invention, through Corporate Intranet 80 is Terminal 82 for content administration for the present invention. When modifications to Knowledge Repository 36 or other components are required, they can be affected from Terminal 82. The provider of the present invention may also be provided access to the system to provide analysis and content modification. Providing RAID 5 Disk Arrays for Databases 78 and internal redundancy to Server 76 of the present invention will ensure maximum up-time.

Figure 9:
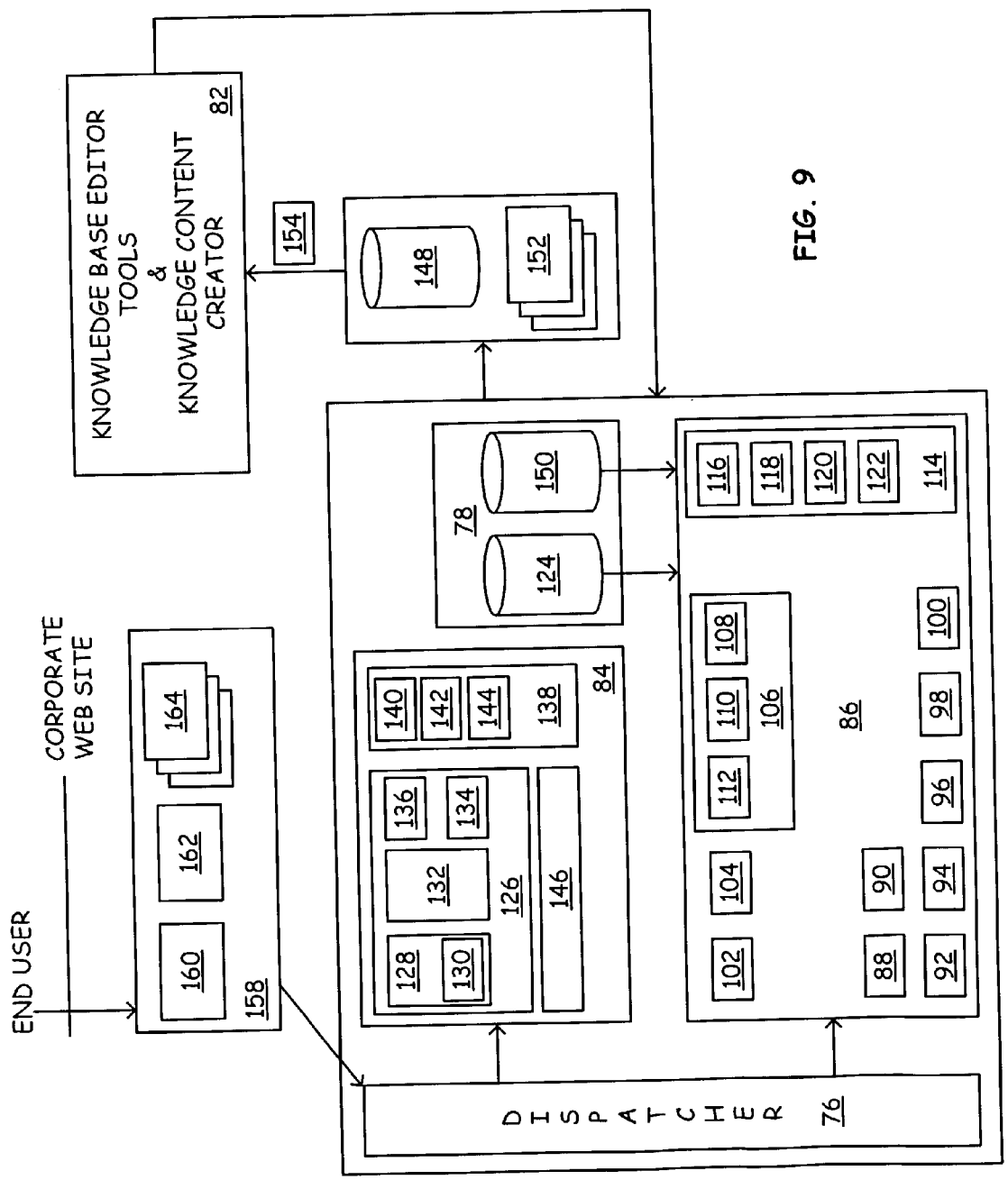
FIG. 9 is a schematic of the functional architecture of the preferred embodiment of the present invention.

The preferred functional architecture of Server 76 and Databases 78 of the present invention is shown in FIG. 9. Server 76 supports both Online Processes 84 and Offline Processes 86. Offline Processes 86 relate to document indexing, data analysis, and summarizing documents. In the preferred embodiment, Offline Processes 86 include Configuration Manager 88, Knowledge Customizer 90 (for use in changing the Templates), System Data Viewer 92, Popularity Scorer 94, Log Loader 96, Report Extractor 98, and Knowledge Loader 100. Offline Processes 86 may also include General Scheduler 102, Document Retriever 104 that utilizes spider technology to locate all web pages on a site, and Document Processing 106, which includes Indexer 108, Summarizer 110 and Document Normalizer 112 (to be able to interpret any format including PRF, HTML, Word and others). Finally, Offline Processes 86 include Snapshot Generators 114. Snapshots of various data components are used in the preferred embodiment in read-only format to provide quick and easy access to information. Snapshot Generator 114 may include Knowledge Repository Snapshot Generator 116, Popularity Snapshot Generator 118, (when using the popularity ranking techniques), Keyword Snapshot Generator 120, and Snapshot Edition Propagator 122. The Keyword Snapshot Generator tracks each term and the page on which it exists as well as the associated weighting under the inverted frequency analysis that will be used during the scoring of results. Keyword Snapshot Generator also tracks any parametric data that can be used for filtering and other techniques in the present invention. This will also allow the present invention, or the content editor to add any tokens into a metatag associated with a page, to either provide a path to index for that tag, or to boost results for a particular concept that may not come through clearly enough indexing only the words on the page. Therefore, as will be clear from this explanation, the present invention during the indexing stage can index against metatags as well as actual content. This feature can be turned off if desired. Snapshots created by Snapshot Generator 114 are accessed by the Online Processes 84 rather than accessing index data from the System Database 124.

Online Processes 84 of the preferred embodiment include Query Processing 126 that includes Entity Tokenizer 128 for the user entered queries. Entity Tokenizer 128 can have its own Tokenizer 130, which performs the functions set forth in FIGS. 6 and 7. In addition, Template Matcher 132 is included, as well as Command Processor 134, and Command Results Processor 136 may be included. Online Processes 84 can also include Command Services 138, which include command services for Popularity 140, when used, Keyword 142, and Related Queries 144. Each of the Command Services 138 is part of executing the various searches of the present invention. Finally, Online Processes 84 use User Interaction Logger 146 to track user activity. The User Activity Logger 146 connects to External Reporting Database 148. The Server 76 of the preferred embodiment has two databases directly associated with it, System Database and Knowledge Database. System Database 124 stores application configuration, commands, status tracking, and an index log. Knowledge Database contains the components of the Knowledge Repository 36, including the Dictionary 40, Templates, all semantic and other recognition data. External Reporting Database 148 can be separate from Server 76, and includes storage of Analysis Report Forms 152. Analysis Server 154 is connected to External Reporting Database 148, and may be used for other applications as well.

The client side of the preferred embodiment of the present invention Client 158 includes Request Translator 160, Transform Engine 162 and XSL Style Sheets 164 for transmission of the user query to the Server 76.

Preferred embodiments of the present invention utilize relational database technology for System Database 124, which support an ODBC interface. The System Database 124 is preferably encapsulated entirely by the software of the present invention. The data may also be stored, in part, in XML format. Preferably no real time writes will go directly to the System Database 124, instead only batch writes scheduled by the Scheduler 102 will interact with the System Database 124.

The ERDB 148 will preferably run industry standard database products, such as either Microsoft SQL Server or Oracle. Similarly, Analysis Reports 152 associated with ERDB 148 preferably use industry standard reporting applications, such as Business Objects, or Crystal Decisions software. The content administration of the system related to Knowledge Repository 36 shown as Knowledge Customizer 156 in FIG. 9, preferably interacts with the internal relational databases. If the original provider remotely manages the Knowledge Customizer 156, or other functionality of the system, the interface preferably is provided through a semi-secure demilitarized zone (DMZ) environment, a Virtual Private Network (VPN), or other connection method such as PC Anywhere, depending on the level of security needed by the web site owner.

As will be appreciated by those skilled in the art, while the present invention in its preferred embodiment is useful to enhance web site searching, it would be applicable to any data repository. Additionally, many of the components of the present invention could be used as components to increase the results of more standardized search techniques. For instance, the use of Knowledge Repository 36 to expand the tokens in a query, as well as enhance the indexing, if used with simple key word searching would improve the results, by incorporating the broader meaning of the user's query to provide more comprehensive results. The analysis of the present invention, while useful to the invention itself, may have application to other instances where insight into customers needs are required. For instance when modifying the web site to better reach customers, or creating an expensive ad campaign. The data from a web site in a particular industry may be useful to the owner of a different web site in the same industry.

INDEX 1

Natural Language Search Runtime Operators. The following operators are preferably used in Template commands or Template identifier text.

1. $TYPE<ENTITY> Returns name of entity, regardless of existence.
2. $ITEM<ENTITY> Returns specific instance that matched the ENTITY. In the example above in the description the list item that matched the Account Type list, in this case "IRA."
3. $STEM<ENTITY> Returns stem of instance that matched the ENTITY. In the example above it returns the stem of the list item that matched the account type, in this case "IRA."
4. $SCORE<ENTITY> Returns the confidence that the matched text is of the type ENTITY.
5. $EXIST<ENTITY> Returns name of entity, but only if it existed in the query.
6. $IF<ENTITY, "text"> Returns text if entity exists.
7. $IFNOT<ENTITY, "text"> Returns text if entity does not exist.
8. $LIST<ENTITY> Renders a list box of entity with matched value selected.
9. $TEXTBOX<paramName> Renders a text box for parameter/entity input.

Other Runtime Values (For use in expressions). The following runtime variables are filled with entity expanded search expressions based on different subsets of the terms in the query.

1. $RawQuery Query as typed by the user.
2. $Query Stems and entities for all words of the query including stop words.
3. $StrippedQuery Stems and entities for all non-stop words of the query.
4. $QuestionStrippedQuery If the query begins with a question prefix (up to 2 words from the question prefix list in an XML configuration file), then specially configured question stop word list can be used (from the same configuration file). If the query is not deemed to be a question, then this value will be the same as the plain stripped query. This will be the most commonly used value.

Example: What is an Individual Retirement Account?
$RawQuery=What is an Individual Retirement Account?
$Query=(?0.9 ?* "ira" ?| ?0.1 ?* "{ira}") ?^ (?0.9 ?* "a") ?^ (?0.9 ?* "be") ?^ (?0.9 ?* "what")
$StrippedQuery=(?0.9 ?* "ira" ?| ?0.1 ?* "{ira}") ?^ (?0.9 ?* "be") ?^ (?0.9 ?* "what")
$QuestionStrippedQuery=(?0.9 ?* "ira" ?| ?0.1 ?* "{ira}")

Note: (1) This is with the token weight set to 0.9 and the entity weight to 0.1; and {ira} denotes the entity IRA.

Search Command Syntax. All the above examples depict "SEARCH" for the SEARCH command service. Note that the end user does not interact directly with the search command syntax. Writing macros will likely be reserved to internal engineering personnel. The "?" is an escape character for operators of the keyword search command service. Any string without this escape is assumed to be a keyword. Keywords with spaces like "New York" must be quoted to be considered as a single word. Otherwise it is interpreted as "New" OR "York".

A preferred embodiment supports the following operators:
1. ?float (i.e., ?0.5) Applies the specified weight to the word (absence/default is 1).

2. ?| Search OR, max of scores of words, union of URLs, merges word position.
3. ?& Search AND adds scores of words, intersection of URLs, applies word position.
4. ?^ Search RELAXED AND combination of sum and product of scores of words that favors URLS with both terms, but is actually a union of URLs, applies word position.
5. ?# Search BAG OF WORDS adds scores for the word to those URLS already selected, but does not add any new URLs to the list.

A current embodiment of the invention uses ?^ as its intersection operator and ?| as the union operator. The intersection operator is for stringing multiple different terms together. The union operator is for combining multiple expressions for the same thing and as such is used for entity expansion. If you were querying for "red or brown shoes", you would want the search command to resolve to "(red ?| brown) ?^ shoes".

Must and Not Operators.
1. ?~binary "SOFT NOT" operator. Binary means that it can be applied over an expression in parentheses. The traditional "hard not" is a unary operator, meaning that it applies just to the single term following. The hard not will disqualify a document for a single occurrence of that term. A possible outcome of this operand is that a mention of a term in an unrelated section of a document would drop it out. The SOFT NOT will penalize the document in proportion to the score of the "SOFT NOT'd" word. See example below.
2. ?+ Unary MUST operator. The following term must occur in the document at least once.
3. ?– Unary NOT operator, a.k.a. HARD NOT. Must not be in the document.

Example: How do I cancel/close my account might reasonably have a Template command of SEARCH (<cancel>?^<account>)

If there are a lot of "cancel order" pages, all of the following can improve the results with the last the most definitive:
1. SEARCH(<cancel>?&<account>) "HARD AND" requires both terms.
2. SEARCH(+<cancel>?^+<account>) "MUST" on both terms requires both, same as above.
3. SEARCH((<cancel>?^&<account>)?~order) "HARD AND" plus "SOFT NOT" of order!

URL Command Syntax. A preferred embodiment of the invention allows the direct specification of a URL result via the Template URL command.

URL(url, action, titleSrc, abstractSrc, [titleText], [abstractText]), where
  url: the URL
    action: 0: display URL
    1: instant redirect
    2: priority placement in results
    3: exclusive URL
  titleSource and abstractSource:
    0: omit
    1: take from document snapshot (default title/abstract of page)
    2: take from following argument
    3: take from question text of template (title only) titleText and abstractText:
      If the match parameters are set to "2" then these fields will be used as the title and abstract. They may be omitted if not used.

EXAMPLES

1. Simplest Useage: URL(url, 0, 1, 1).
2. URL(http://www.etrade.com/cgi-bin/gx.cgi/AppLogic+EStation?PID=learning/bank/transfers1.html, 0, 1, 1, "none, this time", 'no abstract, you can "quote me"')
3. URL encoded for easy CGI test.
   command=URL%28http%3A%2F%2Fwww.etrade.com%2Fcgi-bin%2Fgx.cgi%2FAppLogic%2BEStation%3FPID%3Dlearning%2Fbank%2Ftransfers1.html%2C+0%2C+1%2C+1%2C+%22none%2C+this+time%22%2C+%27no+abstract%2C+you+can+%22quote+me%22%27%29
4. Escaped for command line test.
   command="URL(http://www.etrade.com/cgi-bin/gx.cgi/AppLogic+EStation?PID=service/system_access.hmtl, 0, 1, 1, \"none, this time\", 'no abstract, you can \"quote me\"')"

Complex Macro Expansion Example
1. LHS: Where can I buy <PRODUCT>?
2. RHS as stored in Knowledge Base: ConceptSearch(PRODUCT)
3. Query: Where can I buy HP Laserjet?
4. RHS from Natural Language Knowledge Base: ConceptSearch(PRODUCT)
5. Macro: ConceptSearch(X) (POP($ITEM<X>), SEARCH (?$ConceptWeight ?* $TYPE<X>?| ?$LiteralWeight ?* $ITEM<PRODUCT>).
6. RHS after Expansion: POP("hp laserjet"), SEARCH(?0.5 ?* <PRODUCT>?| ?0.5 ?* "hp laserjet").

Note that the Macro can contain multiple commands as above calls popularity and then keyword search.

What is claimed is:

1. A natural language information retrieval method, comprising:
   receiving a query;
   tokenizing the query;
   identifying entities based on the tokenized query;
   selecting one or more query templates based on a match between the tokenized query and entities and one or more sequence patterns associated with a first portion of the one ore more query templates;
   initiating an information retrieval command associated with a second portion of the selected one ore more query templates;
   receiving results based on the initiated information retrieval command; and
   returning at least a portion of the received results.

2. The method of claim 1, wherein the act of tokenizing comprises:
   identifying semantic units in the query; associating a token with each uniquely identified semantic unit; and representing the query as an ordered combination of the tokens.

3. The method of claim 2, wherein the act of tokenizing further comprises: identifying stems for one or more semantic units; and associating the identified stems with the token associated with the semantic unit.

4. The method of claim 3, wherein the act of tokenizing further comprises: identifying lexical equivalents for a semantic unit; and associating the identified lexical equivalents with the token associated with the semantic unit.

5. The method of claim 4, wherein the act of identifying lexical equivalents comprises identifying misspellings, stems, synonyms, or hyponyms for the identified semantic units.

6. The method of claim 2, wherein the act of identifying a semantic unit comprises identifying single words, multiple word phrases, and arbitrary but predefined character strings in the query.

7. The method of claim 6, wherein the act of identifying arbitrary but predefined character strings comprises identifying email addresses, telephone numbers, acronyms, time indications, state designations, addresses or uniform resource locators (URLs).

8. The method of claim 1, wherein the act of tokenizing comprises representing the query as an ordered sequence of one or more required tokens and zero or more optional tokens.

9. The method of claim 1, wherein the act of selecting comprises:
   ranking a plurality of query templates based on a match between the tokenized query and one or more sequence patterns associated with a first portion of each of the plurality of query templates; and
   selecting a query template having the best match between the tokenized query and the one or more sequence patterns associated with the first portion of the query templates.

10. The method of claim 9, wherein the act of ranking comprises assigning a value to each query template in accordance with any desired relevancy scheme.

11. The method of claim 1, wherein the act of initiating comprises initiating a uniform resource locator display command, a SQL database query, or a text-based query.

12. The method of claim 1, wherein the act of initiating comprises initiating more than one information retrieval command for a selected query template.

13. The method of claim 1, wherein the act of initiating comprises initiating one or more information retrieval commands for one or more selected query templates.

14. The method of claim 1, wherein the act of initiating comprises initiating an operating system call that returns data.

15. The method of claim 1, wherein the act of receiving results further comprises sorting the results in accordance with any desired relevancy scheme.

16. The method of claim 15, wherein the act of returning comprises returning only the 'N' highest ranked received results.

17. The method of claim 16, wherein the act of returning only the 'N' highest ranked received results comprises returning a predetermined number of received results or a predetermined range of the received results.

18. The method of claim 17, wherein the act of returning a predetermined range of the received results comprises returning those results that are in the top ten percent (10%) of the sorted results.

19. The method of claim 1, wherein the act of initiating comprises initiating a standard text-based search based on the query if a relevant query template is not available.

20. The method of claim 19, further comprising recording those queries that are not matched to a relevant query template.

21. The method of claim 20, further comprising alerting an administrator after a specified number of received queries are not matched to relevant query templates.

22. The method of claim 1, wherein the query template comprises one or more static sequence patterns.

23. The method of claim 1, wherein the query template comprises one or more dynamic sequence patterns.

* * * * *